United States Patent

[11] 3,530,894

| | | | |
|---|---|---|---|
| [72] | Inventor | Detlef Henzgen<br>Stuttgart-Bad Cannstatt, Germany | |
| [21] | Appl. No. | 798,020 | |
| [22] | Filed | Feb. 10, 1969 | |
| [45] | Patented | Sept. 29, 1970 | |
| [73] | Assignee | Erich Herion Sr.<br>Stuttgart-Frauenkopf, Germany | |
| [32] | Priority | May 7, 1968 | |
| [33] | | Germany | |
| [31] | | 1,750,483 | |

[54] PNEUMATIC RELAY VALVE
9 Claims, 1 Drawing Fig.

[52] U.S. Cl. .................................................. 137/625.6
[51] Int. Cl. .................................................. F16k 11/07
[50] Field of Search ...................................... 137/625.6, 625.69

[56] References Cited
UNITED STATES PATENTS
3,326,239 6/1967 Saint-Joanis et al. ......... 137/625.66

*Primary Examiner*—Henry T. Klinksiek
*Attorney*—Nolte and Nolte

ABSTRACT: A pneumatic relay valve in which the operation of a reversing valve structure is controlled by means of a valve closing member positioned on a diaphragm. Control pressure is applied to the sides of the diaphragm opposite the valve closing member, and means are provided for adjusting the spacing between the valve closing member and the duct cooperating therewith in order to adjust the valve.

Patented Sept. 29, 1970
3,530,894
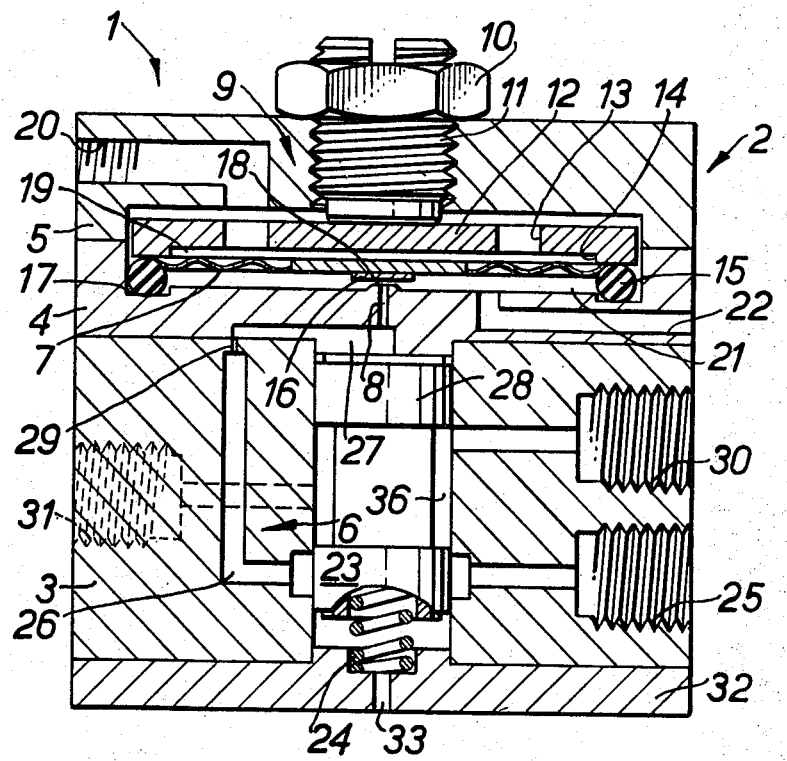
INVENTOR
DETLEF HENZGEN
BY
Nolte & Nolte
ATTORNEYS

PNEUMATIC RELAY VALVE

This invention relates to a pneumatic relay valve of the type in which a diaphragm is employed as a relay member. A reversing valve which may be positioned on the one side of the diaphragm is controlled by means of reversing pressure which, in the unoperated position of the valve, is vented externally by means of a nozzle. A valve closing member on the diaphragm is positioned to close the nozzle and thereby affect the operation of the reversing valve.

Valves of the above type, in which dynamic pressure is produced by closing a nozzle by means of a diaphragm, are already known. In such valves, the force which is necessary on the diaphragm to effect the closing of the nozzle depends upon the dynamic pressure acting on the nozzle. Variations of the required pressure on the diaphragm to close the nozzle may be attained by varying the distance between the nozzle and the diaphragm. In previous devices, such variations of distance between the nozzle and the diaphragm, was obtained by providing a nozzle having external threads and being adapted to be threaded and locked in a threaded bore in the valve housing.

Devices of the above type have the disadvantage that adjustment of the valve is difficult due to the inaccessibility of the threaded nozzle, and that the dimension of the adjustment control members inhibited satisfactory fine adjustment of the valve.

An object of this invention is to provide a pneumatic relay valve for the reversing pressure of a reversing valve, in which the means for adjusting the relay valve are readily accessible, and in which fine adjustment of the relay valve is possible.

According to the invention, the above problem is overcome by providing a pneumatic relay valve in which the distance between the nozzle and the nozzle closing means of the diaphragm is controlled by means of an adjusting device which acts on the diaphragm to control the position of the valve closing means.

According to another feature of the invention, the diaphragm is supported in the valve housing on a sealing ring which is elastic in its axial direction. In this arrangement, the adjusting device comprises an adjusting screw which acts on the side of the diaphragm opposite the sealing ring in order to vary the axial position of the circumferential joint between the diaphragm and the sealing ring. This arrangement thus provides for the simple and reliable adjustment of the position of the valve closing means.

According to a further feature of the invention, a ring-shaped yoke plate is provided between the diaphragm and the adjusting screw, the yoke plate having an axial annular extension in the region of the circumferential joint between the diaphragm and the sealing ring in order to assure good force transmission between the adjusting screw and the circumferential joint. The diaphragm, the circumferential sealing ring and the valve closing means on the nozzle may comprise a single integral structure in order to facilitate mass production of the valve components. The circumferential sealing ring may be a conventional O-ring.

The invention will now be described in more detail with reference to the single figure of a drawing which is a cross-sectional view of a preferred embodiment of the invention.

Referring to the drawing, a relay valve 1 is provided having a valve housing 2. The valve housing 2 is comprised of a housing 3 for a reversing valve 6, a housing 4 for diaphragm 7 and nozzle 8, and a housing 5 for the adjusting device 9.

The adjusting device 9 consists of an adjusting screw 11 threaded in a bore in the housing 5. The screw 11 may be locked in position by means of a conventional lock nut 10. The end of the adjusting screw 11 engages the middle of a ring-shaped yoke plate 12. The yoke plate 12 is provided with axially extending openings 13 for the passage of air, and an annular axial extension 14 is provided on the outer extremities of the plate 12. The annular extension 14 engages the outer periphery of the diaphragm 7, and a circumferential joint in the form of an O-ring is provided on the other side of the outer periphery of the diaphragm 7 opposite the annular extension 14. The circumferential sealing means 15 has a relatively large cross section, and is highly elastic in the axial direction. The sealing ring 15 is integral with the outer periphery of the diaphragm 7. The central portion of the diaphragm 7 is reinforced, and is provided with a valve closure means 16 on the side thereof opposite the plate 12. The diaphragm 7 and the sealing ring 15 are positioned in an annular recess 17 in the housing 4. The housing 4 is provided with a central axially extending nozzle 8 having an orifice 18 aligned with the valve closure member 16, so that the orifice 18 may be hermetically sealed by the closure member 16. The space above the diaphragm 7 comprises a control chamber 19 which is connected to a control line inlet 20 in the housing 5 by way of the walls 13 in the yoke plate 12. The region of the valve 1 between the diaphragm 7 and the housing 4 comprises a chamber 21 which is vented externally of the valve 1 by way of an outlet 22.

The reversing valve 6 in the housing 3 comprises a 3-part 2-position slide valve having a spool shaped sleeve valve member 23 that is axially movable in a chamber 36. A spring 24 is provided in the chamber 36 for urging the sleeve valve member 23 in an upwardly direction. A switching chamber 27 at the upper end of the chamber 36 is connected to a feed pressure inlet 25 by way of a constriction 29 and a feed duct 26 to apply compressed air to the upper end of the valve member 23 for urging the valve member 23 in a downward direction by applying compressed air to the upper surface of the operating piston 28 on the upper end of the sleeve valve member 23.

A return connection duct 30 is provided in the housing 3 providing an external connection to the chamber 36 above the feed pressure connection 25, and a load duct 31 is provided in the housing 3 for providing an external connection to the chamber 36 on the other side of the operating piston 28. The reversing valve 6, the diaphragm 7, the sealing ring 15, the valve closure member 16 and the adjusting device 9 are all arranged centrally about a common axis in the relay valve 1. A centrally located bottom cover 32 is provided on the bottom of the housing 3 of the reversing valve 6, and the cover 32 is provided with an aperture 33 for venting the space in the housing 3 in which the spring 24 is located.

The operation of the relay valve of the drawing will now be described. The drawing illustrates the positions of the components of the valve when there is no pressure in the control chamber 19. At this time the spring 24 holds the sleeve valve member 23 in its uppermost position. A load device connected to the duct 31 will thus be relieved by way of the chamber 36 and the return duct 30. Pressure applied to the feed pressure connection 25 is applied to the switching chamber 27 by way of the feed pressure duct 26 and constriction 29, but due to the effect of the constriction 29 the pressure in the switching chamber 27 is vented externally of the valve by way of the nozzle 8, chamber 21 and outlet 22, so that the pressure in the switching chamber 27 is insufficient to force the piston 28 downwardly in opposition to the upward force from spring 24. The operating piston 23 thus remains in the position shown in the drawing.

In order to reverse the position of the relay valve, control air is applied to the control chamber 19 by way of control line inlet 20. This pressure effects the downward movement of valve diaphragm 17 and closure member 16 connected thereto. When the pressure of the control air is sufficient, depending upon the force required on the diaphragm, the closure member 16 engages the orifice 18 of nozzle 8, thereby closing the nozzle. Closing of the nozzle 8 in this manner inhibits further venting of the switching chamber 27, and consequently pressure increases in the switching chamber 27. When the pressure in the switching chamber 27 has increased sufficiently, the operating piston 28 is forced downwardly against the action of spring 24. This results in the blocking of the return duct 30, and the interconnection of the duct 31 and the feed pressure connection 25 by way of chamber 36. When the air pressure in the control line 20 has reduced sufficiently to permit the closure member 16 to separate from the orifice 18, the pressure in the switching chamber 27 is once again vented by way of the nozzle 8, chamber 21, and outlet 22, thereby permitting the operating piston 28 to return to its initial position as illustrated in the drawing.

The adjusting device 9 is provided in order to provide means for varying the control pressure required to close the nozzle 8. The axial position of the diaphragm 7 may be controlled by means of the adjusting screw 11 which controls the axial pressure applied to the sealing ring 15 by the yoke plate 12. The adjusting screw 11 thus controls the axial compression of the sealing ring 15, so that the diaphragm 7 may be moved downwardly until the closure member 16 engages the orifice 18 of nozzle 8. When the sealing ring 15 is greatly compressed, the control pressure at inlet 20 required for movement of the diaphragm to close the nozzle 8 is very low, and when the sealing ring 15 is only slightly compressed, the force required on the diaphragm to close the orifice 18 is higher, thereby requiring a higher control pressure at inlet 20 to effect the closing of the orifice 18. The compression of the sealing ring 15 and thus the position of closure member 16 in the relay valve 1 may thus be varied by turning the screw 11, and the screw 11 may be locked in any desired position by means of the locking nut 10.

I claim:

1. In a pneumatic relay valve of the type in which a diaphragm is employed as a relay member for a reversing valve means, and wherein reversing pressure for said reversing valve means is produced by closing a nozzle by means of a closure member mounted to move with said diaphragm said nozzle being positioned to vent air current externally of said valve; the improvement comprising adjusting means positioned to control the position of the entire said diaphragm for varying the distance between said nozzle and said closure member carried by said diaphragm.

2. The relay valve of claim 1 comprising a valve housing, sealing ring means positioned to support said diaphragm in said valve housing, said sealing ring means being elastic in its axial direction, and wherein said adjusting means comprises an adjusting screw positioned to control the axial dimension of said sealing ring element.

3. The relay valve of claim 2 comprising annular yoke plate means positioned between said diaphragm and said adjusting screw, said annular yoke plate means having an axial extension engaging said diaphragm in the region of said sealing ring element means.

4. The relay valve of claim 3, wherein said annular yoke plate means has axial bores for the passage therethrough of compressed air.

5. The relay valve of claim 2, wherein said diaphragm, sealing ring element, and closure member comprise an integral member.

6. The relay valve of claim 2 wherein said relay valve is comprised of a housing having first, second and third portions, and wherein said adjusting screw is mounted in said first portion, said diaphragm is mounted in said second portion, and said reversing valve is mounted in said third portion, said first, second and third portions being assembled in that order.

7. The relay valve of claim 1, wherein said reversing valve comprises a multi-way valve having a servo piston movable in the first chamber, spring means for moving said servo piston in one direction in said first chamber, a switching chamber positioned whereby said servo piston may be moved in the opposite direction by air pressure within said switching chamber, a source of reversing air pressure connected to said switching chamber, and means including said nozzle for venting said switching chamber externally of said valve.

8. The relay valve of claim 7 comprising constriction means for applying said reversing air to said switching chamber.

9. A pneumatic relay valve comprising a housing having a first chamber, servo piston means positioned for movement in said first chamber, spring means for urging said servo piston means in one direction in said first chamber, a switching chamber positioned whereby air pressure in said switching chamber urges said servo piston in the opposite direction, a source of feed pressure, constriction means for applying said feed pressure to said switching chamber, a second chamber in said housing axially disposed with respect to said first chamber, nozzle means extending between said switching chamber and said second chamber, a diaphragm having mounted centrally thereon a closure member adapted to engage said nozzle, circumferential sealing ring means at the periphery of said diaphragm, whereby a chamber is formed between said diaphragm and housing into which said nozzle extends, outlet means for venting said last mentioned chamber externally of said valve, annular plate means on the side of said diaphragm in said second chamber opposite said closure means and having axial extensions engaging the periphery of said diaphragm, axial bores in said annular plate means, control line means connected to said second chamber and the end thereof in which said plate means is disposed, and adjusting screw means mounted in said housing and engaging said annular plate means, said sealing ring means being elastic in the axial direction, whereby said screw means is adapted to control the axial compression of said ring means and thereby control the distance between said closure member and said nozzle.